United States Patent
Pandey et al.

(10) Patent No.: US 12,309,879 B2
(45) Date of Patent: May 20, 2025

(54) OPTIMIZING MODIFY BEARER REQUEST HANDLING

(71) Applicant: Cisco Technology, Inc., San Jose, CA (US)

(72) Inventors: Sudeep Kumar Pandey, Acton, MA (US); Rohit Jain, Bothell, WA (US); Ravikant Matwar Prasad Singh, Sunnyvale, CA (US); Sujin Kumar Anagani, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 359 days.

(21) Appl. No.: 17/839,745

(22) Filed: Jun. 14, 2022

(65) Prior Publication Data

US 2023/0403546 A1    Dec. 14, 2023

(51) Int. Cl.
*H04W 4/00*    (2018.01)
*H04W 8/08*    (2009.01)

(52) U.S. Cl.
CPC ..................... *H04W 8/08* (2013.01)

(58) Field of Classification Search
CPC ....... H04W 8/08; H04W 48/18; H04W 36/12; H04W 12/08
See application file for complete search history.

(56) References Cited

U.S. PATENT DOCUMENTS

| | | | |
|---|---|---|---|
| 2010/0238887 A1* | 9/2010 | Koodli | H04W 12/80 370/329 |
| 2011/0199969 A1* | 8/2011 | Yang | H04W 76/12 370/328 |
| 2012/0057532 A1* | 3/2012 | Qi | H04W 12/08 370/328 |
| 2015/0005004 A1 | 1/2015 | Cuervo et al. | |
| 2015/0201394 A1* | 7/2015 | Qu | H04W 4/20 455/456.1 |
| 2016/0057652 A1* | 2/2016 | Chandramouli | H04W 28/0289 370/235 |
| 2017/0126618 A1 | 5/2017 | Bhaskaran et al. | |
| 2017/0257801 A1 | 9/2017 | Toth et al. | |
| 2017/0332296 A1* | 11/2017 | Nilsson | H04W 76/11 |
| 2017/0366960 A1* | 12/2017 | Kim | H04W 8/08 |
| 2018/0295659 A1* | 10/2018 | Shan | H04W 4/24 |
| 2021/0153080 A1* | 5/2021 | Zhu | H04W 36/0016 |
| 2024/0031781 A1* | 1/2024 | Belsare | H04W 76/12 |
| 2024/0048398 A1* | 2/2024 | He | H04M 15/00 |

* cited by examiner

*Primary Examiner* — Abdelnabi O Musa
(74) *Attorney, Agent, or Firm* — Merchant & Gould P.C.

(57) ABSTRACT

Optimizing modify bearer request handling may be provided. A Modify Bearer Request (MBR) may be received by a Serving Gateway (SGW) for a User Equipment (UE). Then a current User Location Information (ULI) may be compared, in the MBR, to a previous ULI. It may then be determined, based on the comparison, determining, if the current ULI and the previous ULI are included in a same Extended-ULI (E-ULI). Next, when the current ULI and the previous ULI are included in the same E-ULI, the MBR may be suppressed from being forwarded to the Packet Data Network (PDN) Gateway (PGW).

20 Claims, 7 Drawing Sheets

OPTIMIZING MODIFY BEARER REQUEST HANDLING

TECHNICAL FIELD

The present disclosure relates generally to optimizing modify bearer request handling.

BACKGROUND

Networking architectures have grown increasingly complex in communications environments, particularly mobile networking environments. Mobile communication networks have grown substantially in subscriber base as end users become increasingly connected to mobile network environments. As the number of mobile subscribers increases, efficient management of communication resources becomes more critical. In particular, there are significant challenges related to providing 3rd Generation Partnership Project (3GPP) accesses efficiently.

An example mobile communication network may comprise a Fifth Generation (5G) network. 5G networks are cellular networks, in which the service area is divided into small geographical areas called cells. 5G wireless devices in a cell communicate by radio waves with a cellular base station via fixed antennas, over frequency channels assigned by the base station. The base stations, termed gNodeBs (gNB), are connected to switching centers in the telephone network and routers for Internet access by high-bandwidth optical fiber or wireless backhaul connections. As in other cellular networks, a mobile device moving from one cell to another is automatically handed off seamlessly to the current cell. 5G may support up to a million devices per square kilometer, for example, while Fourth Generation (4G) may support only one-tenth of that capacity.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Optimizing modify bearer request handling may be provided. A Modify Bearer Request (MBR) may be received by a Serving Gateway (SGW) for a User Equipment (UE). Then a current User Location Information (ULI) may be compared, in the MBR, to a previous ULI. It may then be determined, based on the comparison, determining, if the current ULI and the previous ULI are included in a same Extended-ULI (E-ULI). Next, when the current ULI and the previous ULI are included in the same E-ULI, the MBR may be suppressed from being forwarded to the Packet Data Network (PDN) Gateway (PGW).

Both the foregoing overview and the following example embodiments are examples and explanatory only and should not be considered to restrict the disclosure's scope, as described, and claimed. Furthermore, features and/or variations may be provided in addition to those described. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

In Fourth generation (4G) and Fifth generation non-standalone (5G-NSA) networks, the signaling load primarily comes from General Packet Radio Service (GPRS) Tunneling Protocol Control (GTP-C) messages. The majority of the GTP-C messages are Modify Bearer Request (MBR) messages and the response to the MBR because the MBR and the response is used to maintain and modify existing sessions. With, 5G-NSA introducing E-UTRAN New Radio-Dual Connectivity (ENDC) and New Radio-Dual Connectivity (NRDC), the rate of MBR messages and responses continues to increase.

The base stations for 4G and 5G-NSA networks, eNodeBs (eNBs), each have an associated, unique User Location Information (ULI) value. When a user equipment (UE) is in a connected state, the network needs to know the UE's current location to offer location based services, location based charging, network analytics, and the like. When UEs are moving, such as when a UE is in a vehicle, the UE may move from one eNB coverage area to another eNB coverage area. The handover between eNB's triggers MBR messages to be sent to update the UE's current location. This handover process continuously occurs when the UE is traveling between different eNB coverage areas. Because the network can be servicing millions of UEs, the number of MBR messages and responses can cause network performance degradation. Embodiments of the disclosure may increase network performance by reducing the number of MBRs sent to the Packet Data Network (PDN) gateway (PGW) using a ULI parameter called Extended-ULI (E-ULI).

Figure 1:
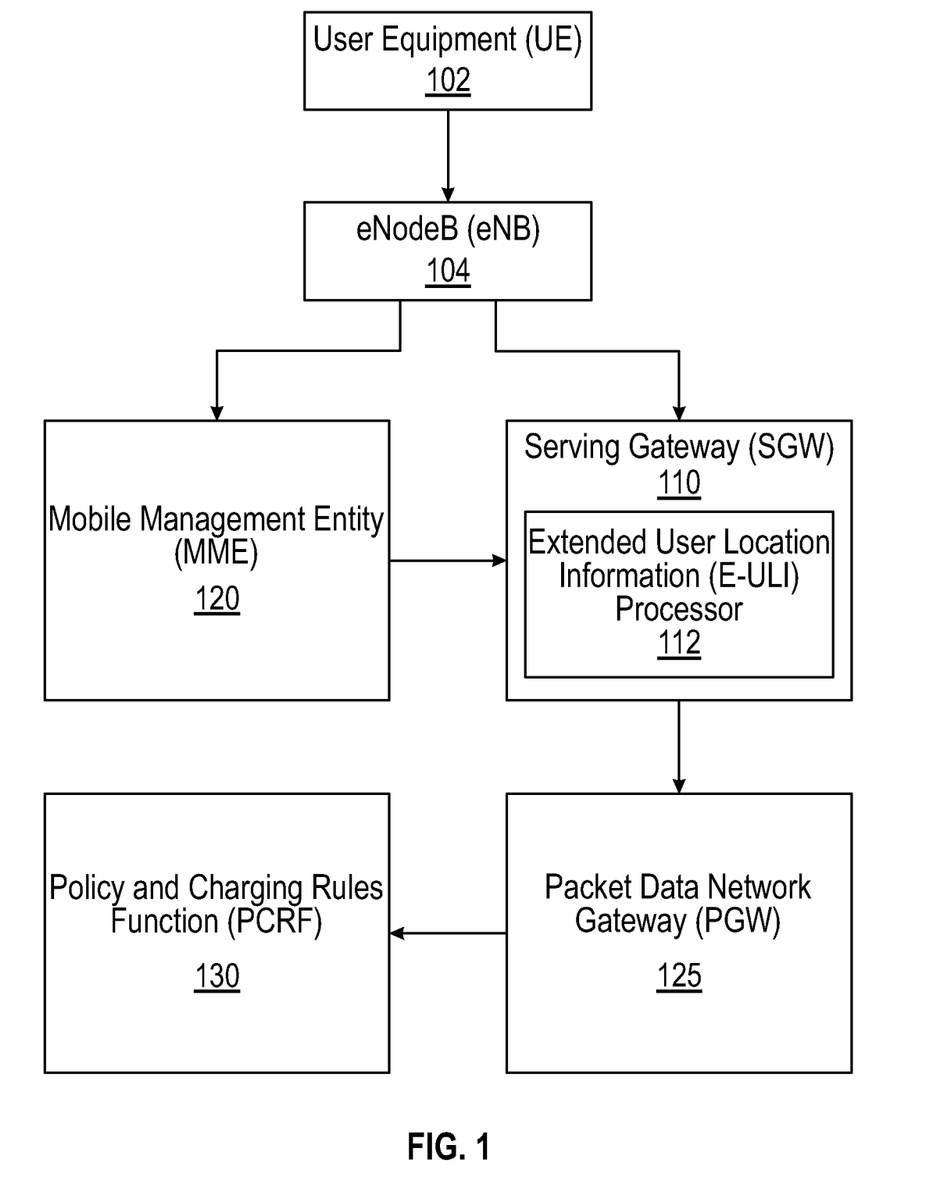
FIG. 1 is a block diagram of an operating environment for optimizing Modify Bearer Request handling.

FIG. 1 is a block diagram of an operating environment 100 for optimizing Modify Bearer Request handling. The operating environment 100 may include a User Equipment (UE) 102, an eNodeB (eNB) 104, a Serving Gateway (SGW) 110, a Mobile Management Entity (MME), a Packet Data Network (PDN) gateway (PGW) 125, and a Policy and Charging Rules Function (PCRF) 130. The operating environment 100 may include any number of components, including multiple UEs 102 and multiple eNBs 104.

The UE 102 may move from one eNB coverage area to the coverage area of eNB 104 coverage area. The handover to the eNB 104 may trigger an MBR to be sent to update the UE's current location. This handover process may occur continuously when the UE is traveling between different eNB coverage areas.

The SGW 110 may include an Extended User Location Information (E-ULI) processor 112. The E-ULI processor 112 may create E-ULIs that encompass the coverage areas of multiple eNBs. For example, the eNB 104 may be in an E-ULI that encompasses multiple eNBs.

The SGW 110 may store the current location of the UE 102 as reported in the last General Packet Radio Service (GPRS) Tunnelling Protocol Control (GTP-C) message, including a Create Session Request message and/or an MBR. Whenever the UE moves to a new eNB coverage area, such as to the coverage area of eNB 104, the MME 120 may forward the resulting MBR to the SGW 110. The SGW 110 may compare the ULI value included in the MBR to the previously reported ULI, included in the previous MBR, for the UE 102. If the current ULI and the previous ULI are included in the same E-ULI, the SGW 110 may suppress the MBR message and may not forward the MBR to the PGW 125. If the current ULI and the previous ULI are not included in the same E-ULI, the SGW 110 may forward the MBR to the PGW 125.

In an example where the UE 102 is in same E-ULI for a predetermined period, the SGW 110 may not suppress the MBR to the PGW 125. In an example where the PGW 125 and/or the PCRF 130 requests location information change reporting, the SGW 110 may not suppress the MBR.

Figure 2:
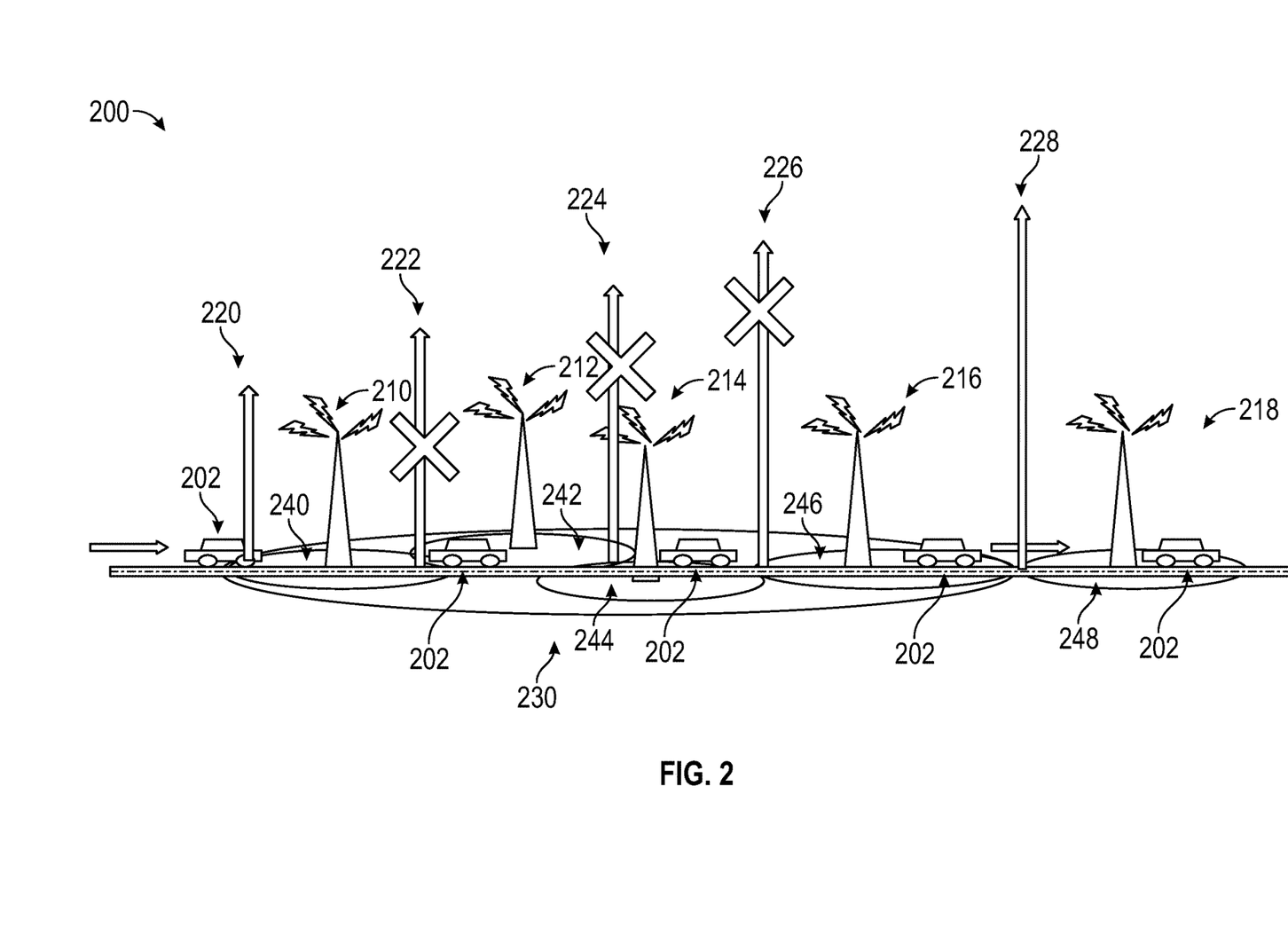
FIG. 2 is a block diagram illustrating an operating environment 200 of User Equipment moving between eNodeB and Extended-ULI coverage areas.

FIG. 2 is a block diagram illustrating an operating environment 200 of User Equipment moving between eNodeB and Extended-ULI coverage areas. The operating environment 200 may include a UE 202 moving in a vehicle, an eNB 210, an eNB 212, an eNB 214, an eNB 216, an eNB 218, an MBR 220, an MBR 222, an MBR 224, an MBR 225, an MBR 228, and an E-ULI 230.

The E-ULI 230 includes the coverage area 240 of eNB 210, the coverage area 242 of eNB 212, the coverage area 244 eNB 214, and the coverage area 246 eNB 216 and does not include the coverage area 248 of eNB 218. When the UE 202 first enters the coverage area of the E-ULI 230, the UE 202 also enters the coverage area 240 of eNB 210. Because the UE 202 has entered the coverage area 240 of eNB 210, MBR 220 may be sent to an SGW, such as SGW 110 shown in FIG. 1. The UE 202 first enters the E-ULI at that point, so the SGW may forward the MBR to the PGW, such as PGW 125 shown in FIG. 1. The movement of the UE 202 may then cause the UE 202 to leave the coverage area 240 of the eNB 210 and enter the coverage area 242 of eNB 212, and MBR 222 is sent to the SGW. The SGW may compare the current ULI information included in the MBR 222 and the previous ULI information included in the MBR 220. Because the ULI information indicates that the UE 202 is still in the coverage area of the E-ULI 230, the SGW may suppress the MBR 222 and may not forward the MBR 222 to the PGW. Similarly, when the UE 202 leaves the coverage area 242 of eNB 212 and enters the coverage area 244 of eNB 214, the current ULI information in the MBR 224 and the previous ULI information in the MBR 222 may indicate that the UE 202 is still in the coverage area of the E-ULI. Therefore, the SGW may also suppress the MBR 224 and not forward the MBR 224 to the PGW. The SGW may also suppress the MBR 226 and not forward the MBR 226 to the PGW because the UE 202 may not leave the E-ULI 230 when moving from the eNB 214 coverage area 244 to the eNB 216 coverage area 246.

When the UE 202 moves from the eNB 216 coverage area 246 to the eNB 218 coverage area 248, the UE 202 may also move from the E-ULI 230 as indicated by comparing the current ULI in the MBR 228 and the previous ULI in the MBR 226. Therefore, the SGW may forward the MBR 228 to the PGW. As a result, the PGW may only receive the MBR 220 and the MBR 228 in the example illustrated by FIG. 2, reducing the load the PGW experiences.

Figure 3:
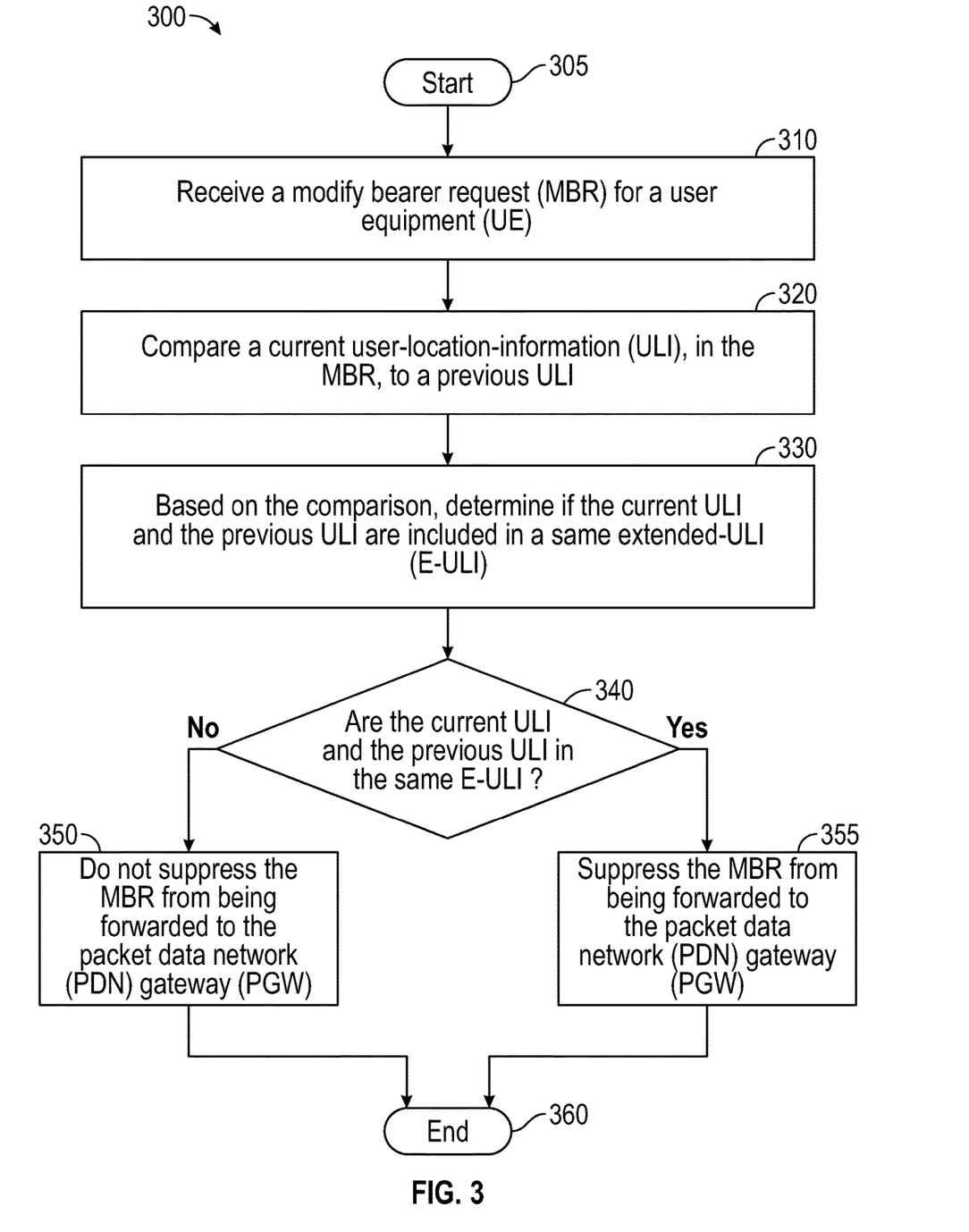
FIG. 3 is a flow chart of a method for optimizing Modify Bearer Request handling.

FIG. 3 is a flow chart of a method 300 for optimizing modify bearer request handling. The method may begin at starting block 305 and may proceed to operation 310 where an MBR for a UE may be received. For example, the UE may move to a new coverage area of an eNB and send the MBR. An SGW, such as the SGW 110 shown in FIG. 1, may receive the MBR.

In operation 320, the current ULI in the MBR may be compared to previous ULI. The previous ULI may be stored by the SGW from the last received MBR. The SGW may compare the current ULI and the previous ULI to determine which E-ULI coverage area the current ULI and the previous ULI are located in.

In operation 330, based on the comparison in operation 320, it may be determined if the current ULI and the previous ULI are included in a same E-ULI. For example, the SGW may determine if the current ULI and the previous ULI are included in a same E-ULI based on the comparison of the current ULI and the previous ULI in operation 320.

In decision 340, if the current ULI and the previous ULI are not in the same E-ULI, the method 300 may proceed to operation 350 where the SGW may not suppress the MBR and may forward the MBR to the PGW, such as PGW 125 shown in FIG. 1. Returning back to decision 340, if the current ULI and the previous ULI are in the same E-ULI, the method 300 may proceed to operation 355 where the SGW may suppress the MBR and may not forward the MBR to the PGW. The method 300 may then proceed to ending block 360.

Figure 4:
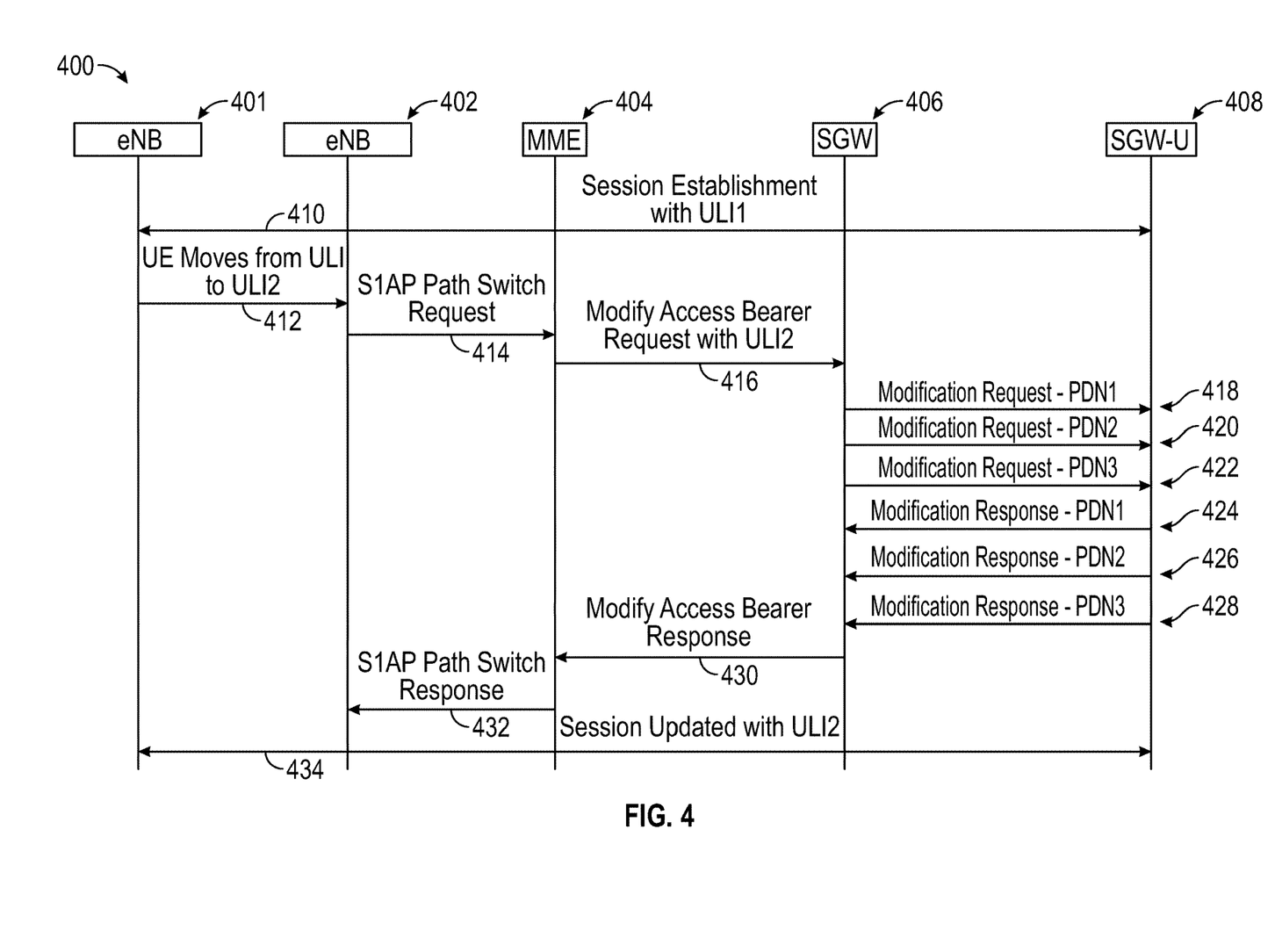
FIG. 4 is a signaling process between eNodeBs, a Mobile Management Entity, a Serving Gateway, and a Serving Gateway user plane for optimizing Modify Bearer Request handling.

FIG. 4 may comprise a signaling process 400 between an eNB 401, an eNB 402, an MME 404, a SGW 406, and a SGW user plane (SGW-U) 408 for optimizing modify bearer request handling. The signaling process 400 may utilize Modify Access Bearer Requests (MABR) in this example to further optimize MBR handling because the using MABR instead of individual MBRs per PDN may be possible because the ULI change is common across all connected PDNs. When a UE has multiple active PDN sessions, the MME may MABR instead of individual MBRs per PDN for a ULI change. The MABR may also include the ULI. In the example illustrated by FIG. 4, there may be active PDN sessions with three PDNs. Furthermore, the signaling process 400 may illustrate an example signaling process when the first ULI and the second ULI are in the same E-ULI and the SGW 406 may not forward the MBR to a PGW.

In signal 410, the eNB 401 and SGW-U may establish a session using the first ULI associated with a UE. In signal 412, the UE may move from the coverage area of eNB 401 to the coverage area of eNB 402. The eNB 402 may send an S1 Application Protocol (S1AP) path switch request to the MME 404 in signal 414. In signal 416, the MME 404 may send a MABR with the second ULI to the SGW 406. In signals 418, 420, and 422, the SGW 406 may send modification requests to the SGW-U 408 for the first, second, and third PDN respectively. In signals 424, 426, and 428, the SGW-U may send the modification responses to the SGW 406 for the first, second, and third PDN respectively.

In signal 430 the SGW 406 may send the Modify Access Bearer Response to the MME 404. In signal 432, the MME 404 may send the S1AP path switch response to the eNB 402. In signal 434, the session may be updated with the second ULI.

Figure 5:
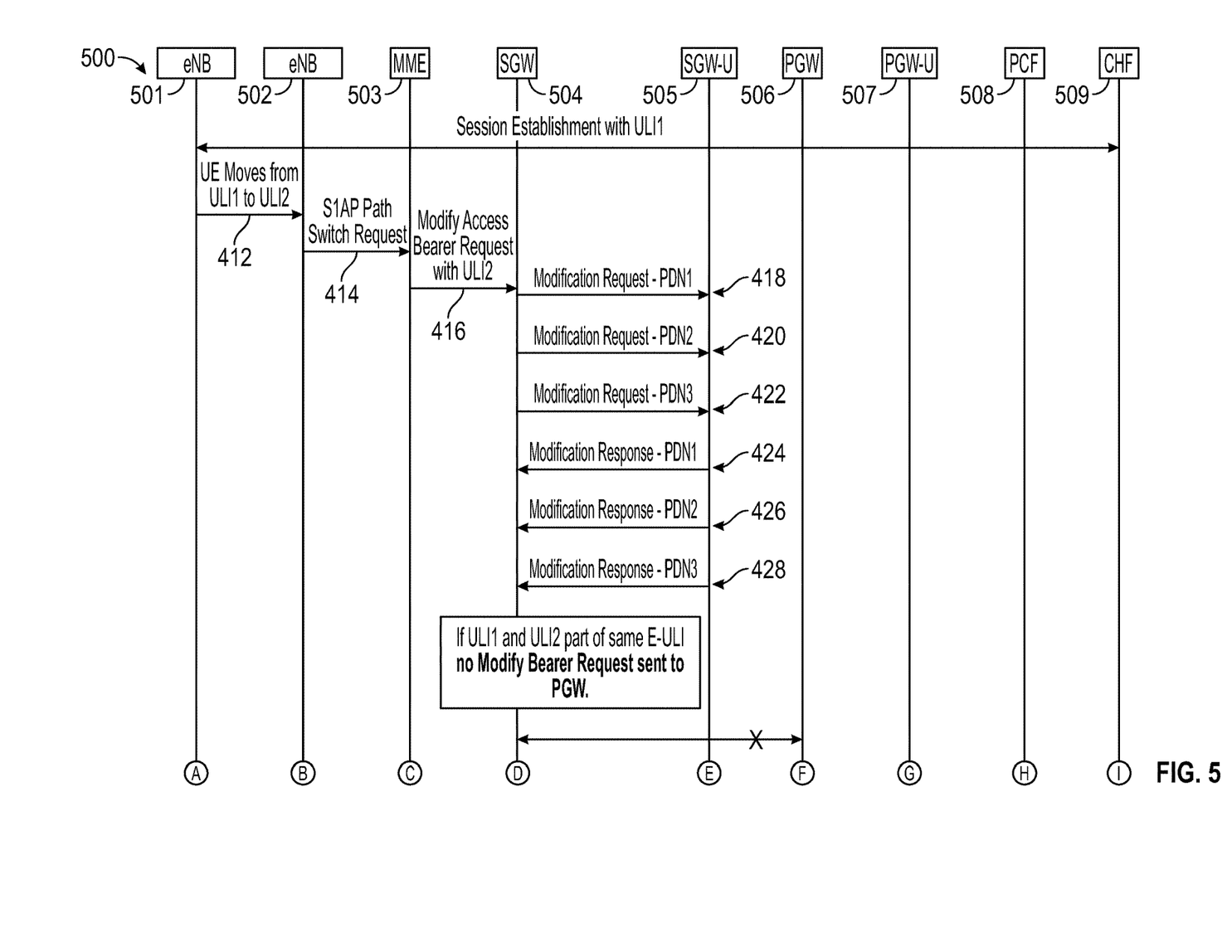
FIG. 5 is a signaling process between eNodeBs, a Mobile Management Entity, a Serving Gateway, a Serving Gateway user plane, a Packet Data Network Gateway, a Packet Data Network Gateway user plane, a Policy control function, and a Charging Function for optimizing Modify Bearer Request handling.

FIG. 5 may comprise a signaling process between an eNB 501, an eNB 502, an MME 503, a SGW 504, an SGW-U 505, a PGW 506, a PGW user plane (PGW-U) 507, a Policy Control Function (PCF) 508, and a Charging Function (CHF) 509 for optimizing Modify Bearer Request handling. The signaling process may include signals 410, 412, 414, 416, 418, 420, 422, 424, 426, 428, 430, and 432 described above with respect to FIG. 4.

Signaling process may also include signals 510, 512, 514, 516, 518, 520, 522, and 524. The signals 510, 512, 514, 516, 518, 520, 522, and 524 may only be performed when the first ULI and the second ULI may not in the same E-ULI. The signals 510, 512, 514, 516, 518, 520, 522, and 524 may be performed for each PDN.

In signal 510, the SGW 504 may send the MBR with the second ULI to the PGW 506. In signal 512, the PGW 506 may send the session modification request to the PGW-U 507. In signal 514, the PGW-U 507 may send the session modification response to the PGW 506. In signal 516, the PGW 506 may send a policy update to the PCF 508. In signal 518, the PCF 508 may send a confirmation to the PGW 506. In signal 520, the PGW 506 may send a charging notification to the CHF 509. In operation 522, the CHF 509 may send a confirmation to the PGW 506. In operation 524, the PGW 506 may send a modify bearer response to the SGW 504.

Figure 6:
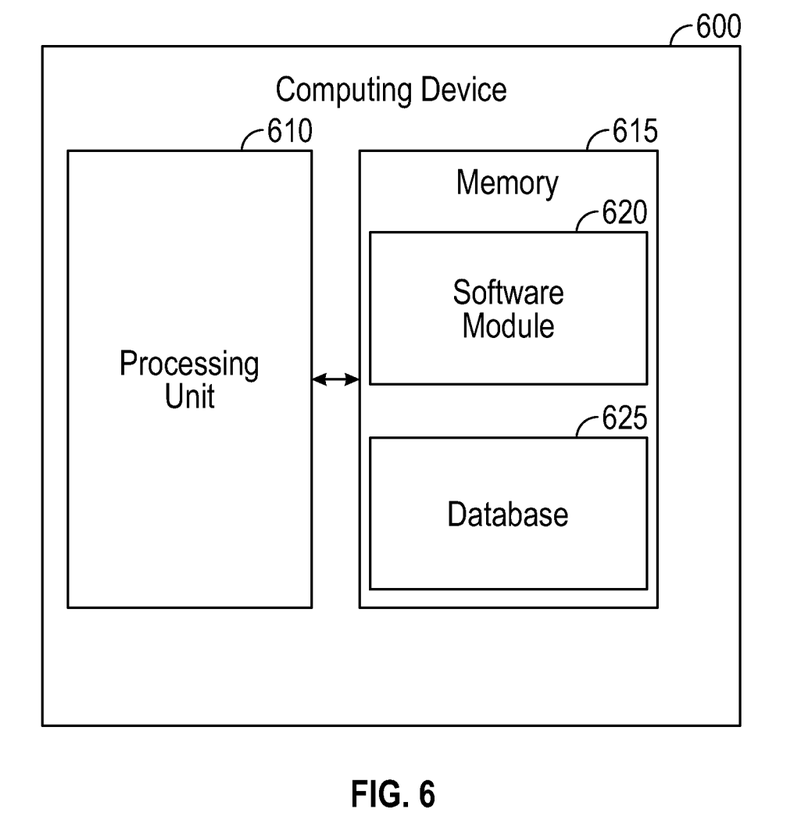
FIG. 6 is a block diagram of a computing device.

FIG. 6 is a block diagram of a computing device. As shown in FIG. 6, computing device 600 may include a processing unit 610 and a memory unit 615. Memory unit 615 may include a software module 620 and a database 625. While executing on processing unit 610, software module 620 may perform, for example, processes for optimizing modify bearer request handling as described above with respect to FIG. 1, FIG. 2, FIG. 3, FIG. 4, and FIG. 5. Computing device 600, for example, may provide an operating environment for the UE 102, the eNB 104, the MME 120, the SGW 110, the PGW 125, the PCRF 130, and/or any other system described herein. The UE 102, the eNB 104, the MME 120, the SGW 110, the PGW 125, the PCRF 130, and/or any other system described herein may operate in other environments and are not limited to computing device 600.

Computing device 600 may be implemented using a Wi-Fi access point, a tablet device, a mobile device, a smart phone, a telephone, a remote control device, a set-top box, a digital video recorder, a cable modem, a personal computer, a network computer, a mainframe, a router, a switch, a server cluster, a smart TV-like device, a network storage device, a network relay device, or other similar microcomputer-based device. Computing device 600 may comprise any computer operating environment, such as hand-held devices, multiprocessor systems, microprocessor-based or programmable sender electronic devices, minicomputers, mainframe computers, and the like. Computing device 600 may also be practiced in distributed computing environments where tasks are performed by remote processing devices. The aforementioned systems and devices are examples, and computing device 600 may comprise other systems or devices.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on, or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to, mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the element illustrated in FIG. 1 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 600 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

The invention claimed is:

1. A method comprising:
receiving, by a Serving Gateway (SGW), a Modify Bearer Request (MBR) for a User Equipment (UE);
comparing a current User Location Information (ULI), in the MBR, to a previous ULI;
based on the comparison, determining that the current ULI and the previous ULI are included in a same Extended-ULI (E-ULI) coverage area, wherein the E-ULI coverage area encompasses at least two eNodeB (eNB) coverage areas, and wherein each of the current ULI and the previous ULI are associated with a different eNB coverage area of the E-ULI coverage area; and
suppressing, in response to determining that the current ULI and the previous ULI are included in the same E-ULI coverage area, the MBR from being forwarded to a Packet Data Network (PDN) Gateway (PGW).

2. The method of claim 1, wherein comparing the current ULI, in the MBR, to the previous ULI comprises determining a time difference between when the current ULI and the previous ULI are received.

3. The method of claim 2, further comprising:
comparing the time difference to a predetermined period; and
when the time difference is greater than the predetermined period, forwarding the MBR to the PGW.

4. The method of claim 1, further comprising:
receiving, from the PGW, a request for location information change reporting; and
based on the request, forwarding the MBR to the PGW.

5. The method of claim 1, further comprising determining the E-ULI coverage area.

6. The method of claim 1, further comprising receiving, by the SGW a previous MBR before the MBR, wherein the previous MBR includes the previous ULI.

7. The method of claim 1, further comprising sending, by the SGW, a Modify Access Bearer Response to a Mobile Management Entity.

8. A system comprising:
a memory storage; and
a processing unit coupled to the memory storage, wherein the processing unit is operative to:
receive, by a Serving Gateway (SGW), a Modify Bearer Request (MBR) for a User Equipment (UE);
compare a current User-Location-Information (ULI), in the MBR, to a previous ULI;
based on the comparison, determine that the current ULI and the previous ULI are included in a same Extended-ULI (E-ULI) coverage area, wherein the E-ULI coverage area encompasses at least two eNodeB (eNB) coverage areas, and wherein each of the current ULI and the previous ULI are associated with a different eNB coverage area of the E-ULI coverage area; and
suppress, in response to determining that the current ULI and the previous ULI are included in the same E-ULI coverage area, suppress the MBR from being forwarded to a Packet Data Network (PDN) Gateway (PGW).

9. The system of claim 8, wherein the processing unit being operative to compare the current ULI, in the MBR, to the previous ULI comprises the processing unit being operative to determine a time difference between when the current ULI and the previous ULI are received.

10. The system of claim 9, wherein the processing is further operative to:
compare the time difference to a predetermined period; and
when the time difference is greater than the predetermined period, forward the MBR to the PGW.

11. The system of claim 8, wherein the processing is further operative to:
receive, from the PGW, a request for location information change reporting; and
based on the request, forward the MBR to the PGW.

12. The system of claim 8, wherein the processing is further operative to determine the E-ULI coverage area.

13. The system of claim 8, wherein the processing is further operative to receive, by the SGW a previous MBR before the MBR, wherein the previous MBR includes the previous ULI.

14. The system of claim 8, wherein the processing is further operative to send, by the SGW, a Modify Access Bearer Response to a Mobile Management Entity.

15. A non-transitory computer-readable medium that stores a set of instructions which when executed perform a method executed by the set of instructions comprising:
receiving, by a Serving Gateway (SGW), a Modify Bearer Request (MBR) for a User Equipment (UE);
comparing a current User-Location-Information (ULI), in the MBR, to a previous ULI;
based on the comparison, determining that the current ULI and the previous ULI are included in a same Extended-ULI (E-ULI) coverage area, wherein the E-ULI coverage area encompasses at least two eNodeB (eNB) coverage areas, and wherein each of the current ULI and the previous ULI are associated with a different eNB coverage area of the E-ULI coverage area; and
suppressing, in response to determining that the current ULI and the previous ULI are included in the same E-ULI coverage area, the MBR from being forwarded to a Packet Data Network (PDN) Gateway (PGW).

16. The non-transitory computer-readable medium of claim 15, wherein comparing the current ULI, in the MBR, to the previous ULI comprises determining a time difference between when the current ULI and the previous ULI are received.

17. The non-transitory computer-readable medium of claim 16, further comprising:
comparing the time difference to a predetermined period; and
when the time difference is greater than the predetermined period, forwarding the MBR to the PGW.

18. The non-transitory computer-readable medium of claim 15, further comprising:
receiving, from the PGW, a request for location information change reporting; and
based on the request, forwarding the MBR to the PGW.

19. The non-transitory computer-readable medium of claim 15, further comprising determining the E-ULI coverage area.

20. The non-transitory computer-readable medium of claim 15, further comprising receiving, by the SGW a previous MBR before the MBR, wherein the previous MBR includes the previous ULI.

\* \* \* \* \*